United States Patent [19]

Garvin et al.

[11] Patent Number: 5,461,843
[45] Date of Patent: Oct. 31, 1995

[54] METHOD FOR TREATMENT OF BAGGED ORGANIC MATERIALS

[75] Inventors: Ronald V. Garvin, Hammond; Larry R. Inman, Warrenton, both of Oreg.; Arthur P. Schuette, Wilmington, N.C.

[73] Assignee: Ag-Bag International, Warrenton, Oreg.

[21] Appl. No.: 296,314

[22] Filed: Aug. 24, 1994

Related U.S. Application Data

[62] Division of Ser. No. 135,046, Oct. 12, 1993.

[51] Int. Cl.⁶ ................................................. B65B 31/06
[52] U.S. Cl. ..................... 53/434; 53/459; 71/9
[58] Field of Search ................... 53/434, 512, 459, 53/576, 567, 428, 128.1; 141/71, 73, 114; 34/218, 225, 233; 71/9

[56] References Cited

U.S. PATENT DOCUMENTS

| | | | |
|---|---|---|---|
| 3,687,061 | 8/1972 | Eggenmuller | 53/576 |
| 3,939,287 | 2/1976 | Orwig | 53/512 |
| 5,016,424 | 5/1991 | Stirling | 53/459 |
| 5,269,829 | 12/1993 | Meyer | 71/9 |
| 5,345,744 | 9/1994 | Cullen | 53/570 |

FOREIGN PATENT DOCUMENTS

| | | | |
|---|---|---|---|
| 29396 | 3/1977 | Japan | 53/434 |
| 29277 | 6/1983 | Japan | 71/9 |
| 2199820 | 7/1988 | United Kingdom | 71/9 |

OTHER PUBLICATIONS

"Baled Feed—Danes Inject New Life Into Straw", from *Power Farming,* Jun., 1983, pp. 56 and 57.
Miller, B., "Slip, Slide and Stuff Big Bales in a Bag", from *Farm Journal Beef Extra*, Mar., 1985, pp. 10 and 11.

*Primary Examiner*—Daniel C. Crane
*Attorney, Agent, or Firm*—Robert L. Harrington

[57] ABSTRACT

A method and apparatus for treating bagged materials. A bagging machine is equipped with feed tubes that feed a conduit through a bag filling tunnel of the machine and through the open end of the bag and into the bag. The conduit is perforated and when the bag is filled, the length of the conduits is extended out through the bag end to be connected to a treatment media, e.g., forced air. An opening is provided at the rear end to provide an exhaust opening for air that is forced into the conduit, out the perforations and through the bagged material. The air will dry the material to lower the moisture content or provide oxygen as may be desired to enhance decomposition. Water may also be introduced as desired.

3 Claims, 3 Drawing Sheets

METHOD FOR TREATMENT OF BAGGED ORGANIC MATERIALS

This is a divisional of copending application Ser. No. 08/135,046 filed on Oct. 12, 1993.

This invention relates to the treatment of organic materials stored in large flexible storage bags and more particularly to the placement of conduits inside the bags to be used as desired to treat the stored materials with a media flowing through the conduits.

BACKGROUND OF THE INVENTION

An array of materials are stored in large plastic bags, e.g., bags that are 4–12 feet in diameter and 300 feet in length. Bags replace silos for the storing of silage. Bags replace granaries for the storage of grain. Bags replace outdoor composting piles for composting garbage. The three examples given have three different objectives. In the case of silage storage, a cut up or ground up agricultural crop, e.g., corn, is stored in a moistened condition. The enclosed crop ferments during the storage period which converts the material to silage, i.e., the pickled state of the crop material. The material is preserved in this pickled state for many months and is a popular form of feed for cattle during the harsh winter months in regions where pasture grass is not available during these months.

In the case of storage of grain for human consumption, pickling is not acceptable. Thus, grain is stored in a dry state. In absence of moisture, grain crop materials will not ferment and the dry grain sealed in a moisture proof container, e.g, a large plastic bag, can be safely stored for many months.

In the case of composting, the exact opposite of grain and silage storage is desired, i.e., the preservation of the material. Composting by definition is the decomposing of a material to rapidly return it to a form that is environmentally acceptable. It is an acceleration of the natural process of rotting and is achieved by exposing the material to a proper balance of moisture and air.

In summary, the fermenting process for producing silage requires a high level of moisture content, i.e., a moisture content above about 22%. Storage preservation for grain requires a low level of moisture content, i.e., below about 15%. Decomposition of garbage requires a moisture content (in the presence of air) of between about 18% to 90%.

Achieving the silage objective is the easier of the three processes. The crop is cut in a green state in which the moisture content is high. It is immediately chopped and placed in storage and as the crop naturally cures, the moisture that is naturally released produces the high moisture content.

Grain storage is a far greater problem. Ideally grain is allowed to totally ripen on the stalk at which point the grain is naturally dry, or it is cut in a semi-ripened state and allowed to lay on the ground where the uncured portion cures and releases its moisture to the atmosphere. However, this presumes that the weather is cooperative. Often it is not. Heretofore, when farmers were forced to harvest their grain crops under conditions where grain was too wet for storage, expensive grain drying techniques had to be employed before the crop could be stored.

The process of decomposing to accelerate rotting requires periodic, controlled exposure to moisture and air and, accordingly, it is an objective of the present invention to provide a means treatment of materials stored in large plastic storage bags including (but not limited to) all three of the above applications.

BRIEF DESCRIPTION OF THE INVENTION

The preferred embodiment of the present invention provides a perforated conduit lengthwise through the interior of the bag. Access to one end of the conduit, e.g., through a hole in the bag end, enables the introduction of a media, e.g, air, into the conduit to be dispersed throughout the material. An outlet may be provided at the opposite end to exhaust the air.

The problem of laying the conduit internally through the length of the bag is accomplished with rigid feed tubes that are mounted in the tunnel of a bagging machine. The feed tubes extend rearwardly in the tunnel to a position where the filled bag is being deployed from the tunnel. The feed tubes have a forward end that is open to the exterior of the tunnel. A roll of flexible perforated conduit is carried on the machine exterior and is fed through the feed tubes into the bag. Crushing and displacement of the conduit is thereby prevented in the area of the tunnel where the material being bagged is in motion. Where the conduits exit from the rigid tubes, the material is substantially static and thereby displacement and damage to the conduits is avoided.

When the bag is totally filled, the bag end is tied around the conduit end which is extended to the bag exterior. (Alternatively, a separate opening is provided in the bag through which the conduit end is extended.) Typically a blower is connected to the exposed exterior end and ambient air is blown through the conduit. An opening is provided in the opposite end of the bag for exhausting the air. Monitors may be provided along the bag (having a probe injected into the material of the bag) to measure moisture content. Alternatively, samples of the bagged material, e.g., grain are simply extracted from the bag and tested. For grain, air is blown through the material until the moisture content is reduced to 15% or less. For compost, ambient air may be blown through the conduit to reduce the moisture content down to the range of between 18% and 22% or if moisture is required, a water saturated air, e.g, steam or even liquid water may be introduced through the conduit. Silage, of course, needs to be maintained at above 22% moisture content and may be accordingly treated.

The above discussion very generally explains the method and apparatus for treating bagged materials and both will be more clearly understood by reference to the following detailed description and drawings referred to therein. Whereas this detailed description is primarily directed to grain storage, the reader will appreciate the ready application of the structure and processes to various other organic materials.

2 without the bag and illustrating the conduit feeding tubes in more detail.

DETAILED DESCRIPTION OF THE INVENTION

Figure 1:
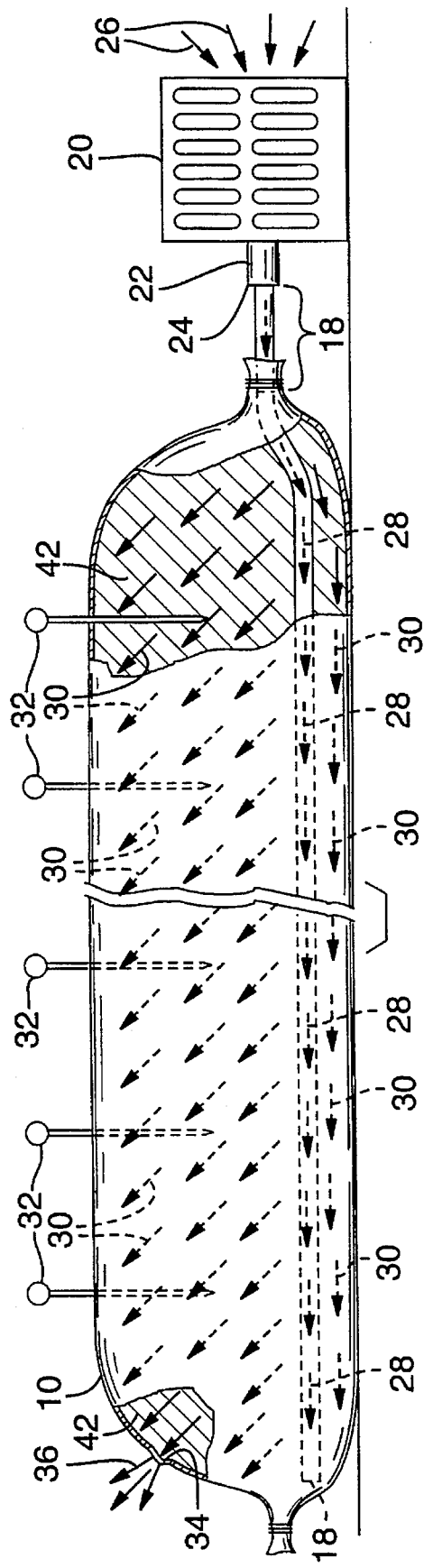
FIG. 1 schematically illustrates the process of the invention for treating bagged materials.

Reference is made to FIG. 1 which illustrates the process of treating the bagged materials. The bag 10 as illustrated is filled with a material which may be silage, grain, compost or other organic material which is capable of fermenting and/or decay. If the material 12 is grain that is in a too-moist condition for conventional storage, i.e., with a moisture content above 15%, it must be dried in order to prevent decay or fermenting. If the material is garbage that is to be composted, it must be provided, e.g., with oxygen as well as moisture to maintain the decaying process. In either event, the treatment prescribed is most likely to be aeration of the material with ambient air. As illustrated, a perforated conduit 14 is laid along the interior of the bag substantially the full length of the bag. The conduit is placed close to the bottom, e.g, about a foot off the bottom of the bag. It is believed that it is preferable to provide multiple conduits, e.g., four conduit sections along the bottom as illustrated but the number and location are somewhat determined by the design of the bagging apparatus and the materials and the condition of the materials being bagged. Other patterns of conduit placement may well prove to be as successful or even preferred to that illustrated and thus the invention is not limited to the illustrated arrangement or placement of the conduits.

Figure 1A:
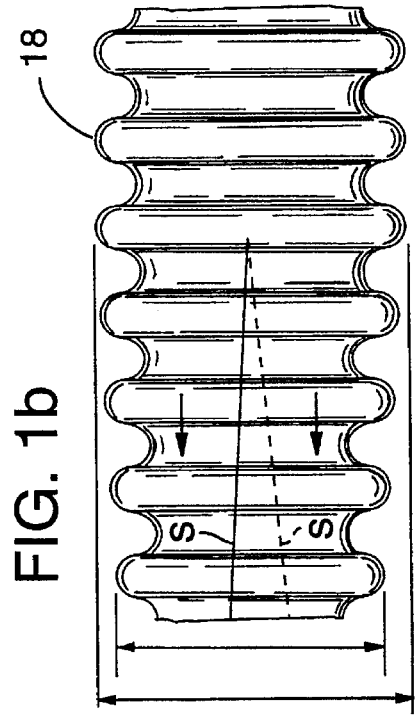
FIG. 1a illustrates a section of perforated conduit used for treating the bagged materials.

The conduit 14 and the pattern of perforations provided therein is illustrated in the enlarged view of FIG. 1a. A short section of the conduit 14 as shown includes long narrow slits 16, e.g., having a width of about 1/16 inch, a length of about 3/4 inch and a diameter of 3 inches. The conduit is corrugated to have rigidifying ribs and intermediate grooves wherein the slits are provided. A known acceptable conduit is a corrugated conduit formed of semi-flexible plastic available from the Familian N.W. Company under the trade name ADS Sewer/Drain Pipe.

Figure 1B:
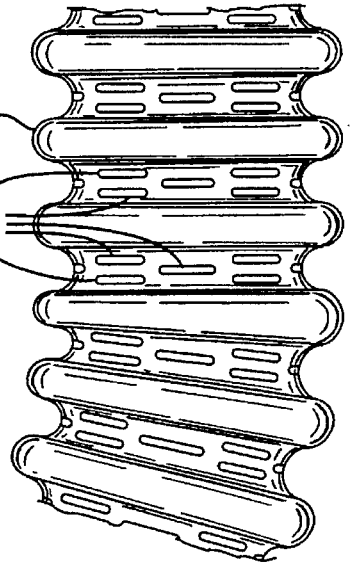
FIG. 1b illustrates a section of non-perforated conduit to be coupled to the perforated conduit of FIG. 1a and extended through the bag end.

With reference to FIG. 1, the start-up end 18 of the conduit may or may not be plugged as desired to control the flow rate through the slots 16 and a rearmost section 18 of the conduit will not be perforated so as to maintain air pressure through the conduit until flowing air reaches the filled portion of the bag. The transition from perforated to non-perforated conduit can be provided in a number of ways. For example, as illustrated in FIG. 1b, different sections of the conduit can be readily coupled together. Thus, once the end of the bag is determined, the perforated conduit 14 can be severed and a non-perforated section 18 can be added for extension out the end of the bag. As shown, the end of conduit section 18 can be split and the circumference reduced (by overlapping the split sides as indicated by full line S and S') to fit the end of the perforated conduit. A more simple approach would be to simply extend the same perforating conduit out through the bag end but wrap that portion designated as section 18 with tape or the like to close the perforations. A third alternative is to generate the perforations as the conduit is being placed in the bag and simply discontinue the perforations when the bag end is reached.

As noted from FIG. 1, a blower 20 is schematically illustrated including an outlet nozzle 22 that is attached to the end 24 of the conduit 14. The treatment process as illustrated is thus the intake of ambient air to the blower 20 as illustrated by arrows 26, and the forced flowing of the air through the conduit as indicated by arrows 28 and into the material 12 as indicated by arrows 30.

As of the filing of this application for patent, insufficient data has been developed to determine the actual pattern of air flow from the conduit 14 into and through the material contained in the bag 10 or the optimum number and arrangement of the conduits provided along the interior of the bag. Nevertheless, the apparatus and processes described herein have been produced and operated under test conditions sufficiently to determine that the process does function to produce the desired results. Such has been established by the periodic extraction of grain samples from the bag at intervals along the length of the bag which were lab tested and found to be satisfactorily reduced in moisture content following treatment. The grain was initially determined to have a moisture content exceeding 18% when placed in the bag and following aeration as illustrated in FIG. 1, the moisture content along the length was reduced to below 15% moisture content.

Whereas the bags 10 utilized in this process are both moisture proof and air tight, it was believed necessary to provide a venting outlet. By placement of a single vent at the end illustrated as outlet 34, it is believed that the path of the air flow 30 is caused to flow outward and rearward as suggested by the arrows 30 toward the outlet 34 to be vented to the atmosphere as indicated by arrows 36.

Figure 2:
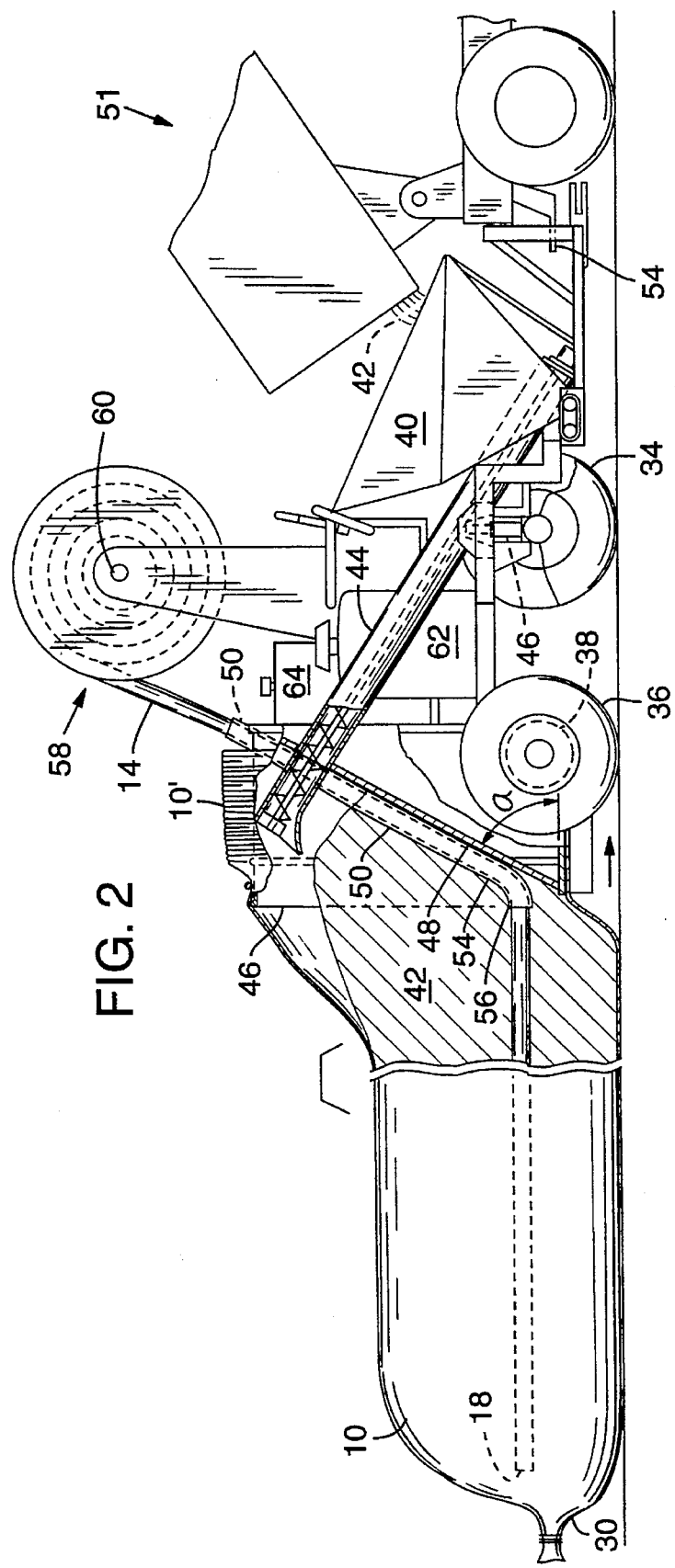
FIG. 2 schematically illustrates the process and apparatus of the invention whereby conduit is placed in a flexible bag being filled with the material to be treated by the process of FIG. 1.

Reference is now made to FIG. 2. Basically the machine of FIG. 2 but without the venting components which is explained hereafter is disclosed in detail in the commonly owned U.S. Pat. No. 5,140,802 and is incorporated herein by reference. In essence the machine 38 includes a hopper 40 for receiving grain 42, e.g., from a truck 51 which is augured from the hopper 40 by an auger 44 to a tunnel 46. The grain 42 is piled in the tunnel and flows from the pile into the bag 10. As the bag fills, the pile height increases and the forward pressure against a forward angled wall 48 of the tunnel 46 causes forward movement of the tunnel and incremental deployment of the bag which is folded or gathered around the tunnel and which is denoted 10'. As described above, the machine is disclosed in detail in the '802 patent.

The added structure for venting or treatment of the material will be explained but first it should be appreciated that there are known bagging machines for bagging silage and compost materials an example of which is illustrated in U.S. Pat. No. 4,337,805. The venting structure which will now be explained is readily adapted with minor modifications to these other structures.

Figure 3:
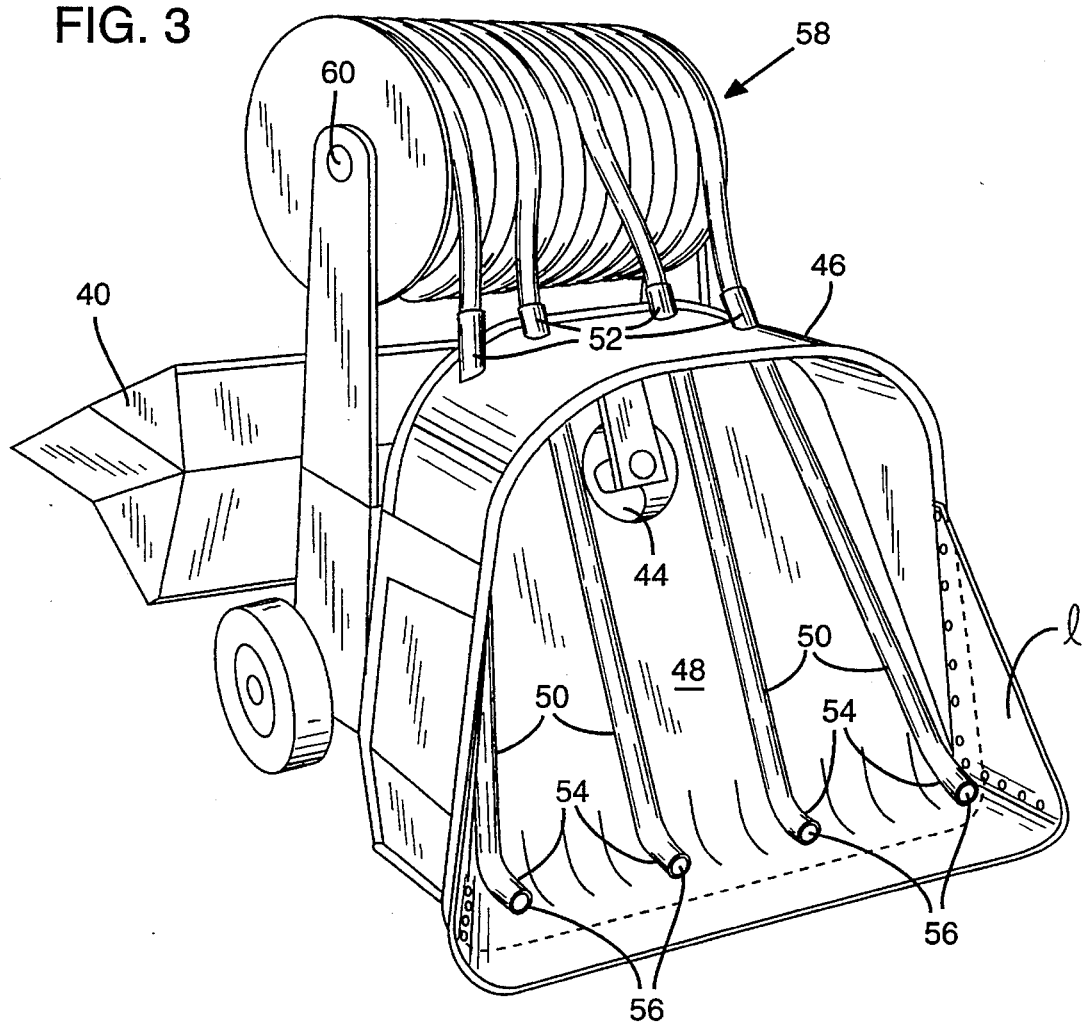
FIG. 3 is a perspective rear view of the apparatus of FIG.

The added structures will be explained with reference to both FIGS. 2 and 3. FIG. 3 is a perspective view looking into the back end of tunnel 46 with the bag removed (and, of course, with no grain occupying the tunnel interior).

As shown in FIG. 3, four rigid metal tubes 50 extend from an exterior open end 52, down through the top of the tunnel 46 along the rearwardly declining face of rearward wall 48. At a position above the bottom of the tunnel, the tubes 50 curve away from wall 48 to form a rearwardly projected end section 54 having an end opening 56 located approximately at the rear end of the tunnel (exclusive of the liner 1 shown in FIG. 3 which projects rearwardly beyond the tunnel end shown in dash line and into the bag as explained in the '802 patent).

The position of the rear opening 56 at the rear end of the tunnel as shown in the drawings is desirable for several reasons. The grain being deposited in the tunnel is in a state of movement as the tunnel first fills with grain and then flows rearwardly into the bag. This flow of grain (or silage or compost material) will disrupt the placement of a loose flexible hose inside the tunnel. Thus, the rigid feed tube preferably extends to the end of the tunnel so that the flexible conduit 14 is placed directly into the bag where the grain is at rest. On the other hand, it is desirable not to have the tubes extended rearwardly of the tunnel where it adds to the overall length and creates problems in packaging and shipment of the machine. An obvious variation is to provide removable extensions for the feed tubes 50 if additional rearward length is deemed desirable.

Referring to FIG. 2, it will be appreciated that the preferred conduit 14 is a flexible plastic that can be formed into a roll as illustrated at 58 and mounted on a reel (represented by shaft 60). Once the conduit is fed through the rigid feed tubes 50 to be placed under the grain 42, the further feeding of the conduit will be automatic. That is, the conduit portion residing in the bag will be held in place by the weight of the grain and forward movement of the machine will simply unroll additional conduit from the reel 60.

There are numerous variations that are possible. The objective, of course, is to provide treatment, e.g., aeration, consistently throughout the bag material. A single conduit may be sufficient in some cases. The conduit may preferably be positioned in the center of the bag. A plurality of conduits, e.g., four, may be preferably positioned symmetrically through the bag. Silage bagging machines have different mechanisms and it may be preferable to extend the tubes along the sides or along the top of the bagged material. The users of the equipment and methods employed will vary from one application to the other and the location of the conduits and the feed tubes will be varied as well. In all cases where loose flexible conduit is utilized, it is believed that a securely positioned rigid feed tube is important to avoid displacement due to material turmoil caused by the filling process. Whereas a rolled flexible tube is believed most convenient, it is also contemplated that rigid conduit sections may be utilized with successive sections being coupled one to the other as they are fed through a straight feed tube and into the bag.

All of the above and numerous variations will become apparent to those skilled in the art. Accordingly, the scope of the invention is determined by the claims appended hereto.

We claim:

1. A method of treating organic materials comprising:

enclosing organic materials in large plastic storage bags that are impervious to moisture and air;

providing at least one conduit in the organic material as enclosed which has one end extended out of the bag and exposed to the exterior of the bag, and providing multiple openings through the walls of the conduit along the length of the conduit inside the bag and exposed to the organic material therein;

providing a vent opening in the bag at a position spaced from the conduit and spaced from the one end of the conduit extended out of the bag, and forcing a media suitable for treating the organic material in the bag into the exposed end of the conduit, through the openings in the conduit and into the material in the bag for treating said material said vent opening positioned for circulation of said media through said organic material and out of the vent opening.

2. A method as defined in claim 1 wherein the media is air, attaching a blower to the exposed end and blowing air into said conduit for aerating said material.

3. A method as defined in claim 2 wherein the material is grain to be dried.

\* \* \* \* \*